United States Patent
Takano et al.

(10) Patent No.: US 10,725,247 B2
(45) Date of Patent: Jul. 28, 2020

(54) DUAL KEY POLARITY CHANGEABLE CONNECTOR

(71) Applicant: Senko Advanced Components, Inc., Marlborough, MA (US)

(72) Inventors: Kazuyoshi Takano, Tokyo (JP); Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/513,006

(22) Filed: Jul. 16, 2019

(65) Prior Publication Data

US 2019/0339459 A1    Nov. 7, 2019

Related U.S. Application Data

(63) Continuation of application No. 16/178,253, filed on Nov. 1, 2018, now Pat. No. 10,393,969, which is a continuation of application No. 15/456,792, filed on Mar. 13, 2017, now Pat. No. 10,146,012, which is a continuation of application No. 15/205,773, filed on Jul. 8, 2016, now Pat. No. 9,939,589.

(51) Int. Cl.
*G02B 6/38*      (2006.01)
*G02B 6/00*      (2006.01)

(52) U.S. Cl.
CPC .............. *G02B 6/3831* (2013.01); *G02B 6/00* (2013.01); *G02B 6/387* (2013.01); *G02B 6/3812* (2013.01); *G02B 6/3825* (2013.01); *G02B 6/3869* (2013.01); *G02B 6/3871* (2013.01); *G02B 6/3885* (2013.01); *G02B 6/3893* (2013.01)

(58) Field of Classification Search
None
See application file for complete search history.

(56) References Cited

U.S. PATENT DOCUMENTS

| | | | |
|---|---|---|---|
| 5,041,025 A | 8/1991 | Haitmanek | |
| 2012/0099822 A1* | 4/2012 | Kuffel | G02B 6/383 385/78 |
| 2013/0322825 A1* | 12/2013 | Cooke | G02B 6/3851 385/59 |
| 2015/0378113 A1 | 12/2015 | Good et al. | |
| 2016/0259135 A1* | 9/2016 | Gniadek | G02B 6/3885 |
| 2017/0254966 A1 | 9/2017 | Gniadek et al. | |

* cited by examiner

*Primary Examiner* — Chad H Smith
(74) *Attorney, Agent, or Firm* — Edward S. Jarmolowicz, Esq.

(57) ABSTRACT

Optical fiber connectors configured to allow ease of change of the connector polarity by providing lockable outer housing. In an embodiment, an optical fiber connector comprises an inner housing, at least one key configured to move along the inner housing so as to change a polarity of said optical fiber connector, and an outer housing disposed around at least a portion of the inner housing and configured to slide in a longitudinal direction so as to expose at least a portion of said at least one key, wherein the outer housing includes a flexible portion configured to lock to the inner housing so as to retain the outer housing in a pulled back position relative to the inner housing. A removable alignment key is reattached to the connector to correspond to a first or second polarity.

8 Claims, 10 Drawing Sheets

DUAL KEY POLARITY CHANGEABLE CONNECTOR

CROSS REFERENCE TO RELATED APPLICATIONS

This application is a continuation of U.S. patent application Ser. No. 16/178,253, filed Nov. 1, 2018, which is a continuation of U.S. patent application Ser. No. 15/456,792 filed Mar. 13, 2017, now U.S. Pat. No. 10,146,012, titled "Polarity Changeable Connector", which is a continuation of U.S. patent application Ser. No. 15/205,773 filed on Jul. 8, 2016 which is now U.S. Pat. No. 9,939,589, titled "Polarity Changeable Connector," all of the above are incorporated herein by reference in its entirety into this application.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds Individual optical fibers are extremely small. For example, even with protective coatings, optical fibers may be only about 250 microns in diameter (only about 4 times the diameter of a human hair). As such, hundreds of fibers can be installed in cables that will take up relatively little space. For connections between cables, however, the fibers are terminated with connectors. Multiple fibers may be arranged within a single connector. For example, multi-fiber connectors such as those using multi-fiber push-on/pull-off (MPO) technology may contain and connect 12 or 24 fibers. Connectors, such as MPO type connectors, generally include a housing portion that contains a ferrule that terminates the ends of the fibers. Ferrules are generally used to retain the ends of the optical fibers for connecting the optical fibers. One type of optical ferrule that may be used with MPO type connectors is an MT (Mechanically Transferable) ferrule.

Typically, MPO connectors are joined together to connect the optical transmission path of one fiber optic cable to another fiber optic cable or device, and the connection may be made by inserting the MPO connectors in an MPO adapter. An adapter generally includes a housing, or portion of a housing, having at least one port which is configured to receive and hold a connector to facilitate the optical connection of the connector ferrule with the ferrule of another connector or other device. Adapters may be used to facilitate connections contained within a chassis. The term "chassis" as used herein broadly refers to a containment structure for housing electrical components or switching components.

As a result of the use of pre-terminated fiber assemblies, the issue of maintaining polarity in parallel fiber-optic links is becoming increasingly important. Described simply, polarity maintains proper continuity between transmitters and receivers. In order to make sure that connectors are mated correctly with an adapter, the connector and adapter typically include fixed keying features that permit the connector to be mated with the adapter in generally only one mating configuration. While this has the advantage of preventing a connection that has the wrong polarity, it also can make it difficult to change the polarity of the connection on site.

Therefore, there remains a need for multi-fiber, fiber optic connectors that have the flexibility of easily changing the polarity of the connector on site.

SUMMARY

In one embodiment, an optical fiber connector comprises a ferrule, and an inner housing disposed around at least a portion of the ferrule, the housing comprising a first end for being inserted into an optical fiber adapter, and a second end disposed opposite the first end. The connector further comprises at least one key configured to move along the inner housing so as to change a polarity of said optical fiber connector with respect to the adapter. The connector further comprises an outer housing disposed around at least a portion of the inner housing and configured to slide in a longitudinal direction towards the second end so as to expose at least a portion of said at least one key, wherein the outer housing includes a flexible portion configured to lock to the second end of the inner housing so as to retain the outer housing in a pulled position at the second end of the inner housing.

In some embodiments, the flexible portion may be configured to engage a mating portion at the second end of the inner housing. In some embodiments, the flexible portion may comprise an opening and the mating portion may comprise a protruding portion configured to engage the opening when the flexible portion is pushed towards the second end. In some embodiments, the opening may have a circular shape. In some embodiments, the connector comprises at least one biasing member for biasing the outer housing towards the first end of the inner housing. In various embodiments, the connector may be an MPO connector. In some embodiments, the flexible portion may comprise a flat surface.

In some embodiments, the at least one key may include a surface having a draft angle. The inner housing may include a corresponding surface having a corresponding draft angle and configured to retain the at least one key. In one embodiment, the draft angle may be about three degrees.

DETAILED DESCRIPTION

Figure 1:
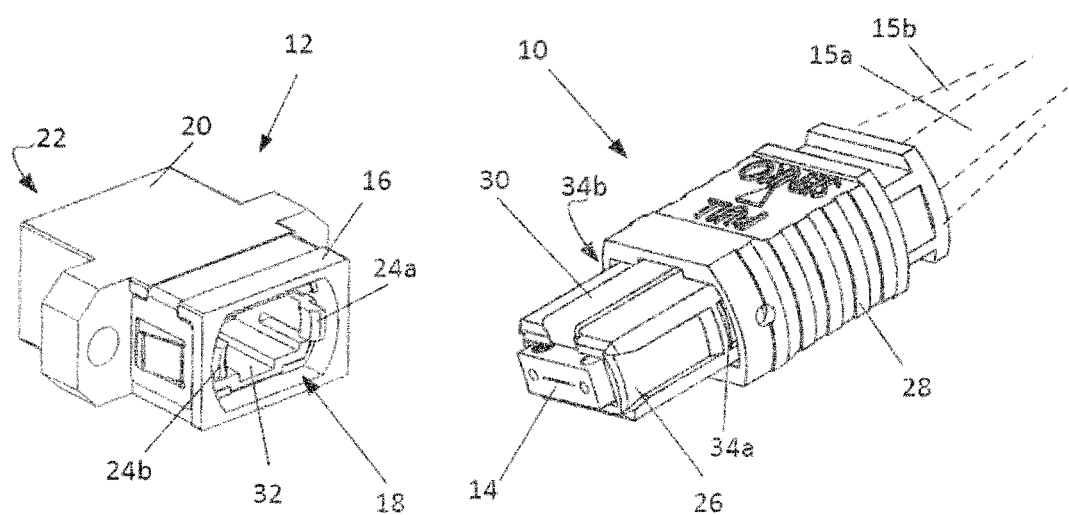
FIG. 1 depicts perspective views of a polarity changeable MPO connector and adapter.

So that the polarity of a multi-fiber, fiber optic connector, such as an MPO connector, may be changed, a housing of the connector may be configured to include a removable key that may be positioned at alternate locations on the housing. To change the polarity, the key may be moved from one location to another. In some embodiments, changing the polarity requires a user to slide back and hold back an outer housing of the connector, push a key in or pull it out on one side of the housing, and do the reverse, that is pull the key out or push it in on the opposite side of the housing. However, this process ideally requires "three hands," and may be facilitated in various embodiments disclosed herein, by providing a lockable outer housing of the connector, so as to allow a user to use both hands to move the key.

Various embodiments provide multi-fiber, fiber optic connectors, such as an MPO connector, having an outer housing configured to be pulled back from the main body or inner housing, then squeezed to lock it, so that the outer housing will not push back to its original position. This allows users to change the position of the key without having to hold back the outer housing, thereby reducing the complexity of the operation needed to change the connector's polarity.

In various embodiments, the key may be configured such that it does not slide out of the connector easily. For example, the key may be configured to include a surface having a draft angle instead of a flat surface. Further, the main body or inner housing of the connector may include a corresponding surface having a draft angle and configured to engage the key. In one embodiment, the draft angle may be about 3 degrees. The draft angle prevents the key from easily coming out or slipping out of the connector.

Embodiments disclosed herein provide several advantages, including for example an easy to use polarity change function. If a key is incorrectly aligned with a connector, usually the connector will be rendered unusable. However, the polarity change function allows the connector, such as an MPO connector, to be usable, by easily switching the polarity of the connector. Further, embodiments are configured to prevent the key from easily slipping out of the connector.

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors therein to align and connect optical fibers end-to-end. As described herein, the connectors and adapters may be considered multi-fiber connectors and multi-fiber adapters.

While the following description is directed towards MPO adapters and MPO connectors with MT optical ferrules, the embodiments described may be applicable to other adapters, connectors and ferrule types as well. An embodiment of an MPO connector 10 and adapter 12 are generally represented in FIG. 1. A first end of the connector 10 may include a ferrule 14 that may be a multi-fiber ferrule as shown. In addition, the connector 10 may have attached thereto, a fiber optic cable 15a and cable boot 15b (shown only schematically) that may extend from a second end of the connector.

An adapter 12 may include a first end 16 having a first plug-in port 18 for receiving the ferrule end of an optical fiber connector 10 therein, and may include a second end 16 having an additional plug-in port 22 (not visible) for receiving an additional MPO optical fiber connector, or other type of fiber optic device therein.

For retention of an MPO connector 10 within each of the ports 18, 22 the ports may be provided internally with a connector clip that may be formed by the two resilient tabs 24a, 24b configured to be displaceable outwardly for insertion and removal of a connector 10 into or out of the ports 18, 22, and return to essentially their original position to engage and retain a connector in the ports. Adapters 12 may be configured to be mounted on a chassis panel, and may include mounting flanges 26a, 26b to mount the adapter via screws, for example.

A connector 10 may include an inner housing 26 that may surround the ferrule 14. In the embodiment depicted, ferrule 14 is of the female type—a pairing connector may have a male-type ferrule with two guide pins that fit into the receiving holes of the female ferrule. A connector 10 may also include an outer housing 28 that may be slidably disposed about the inner housing 26 adjacent the second end of the connector 10. To provide for a pre-determined alignment of the fiber optic cables within the adapter 12, the inner housing may include an alignment key 30 that is configured to fit within keying slot 32 of the adapter. For example, in the embodiment depicted, one of the connector 10 or adapter 12 will need to be rotated about its axis 180° to align the key 30 with the slot 32. Inner housing 26 may slide into port 18 until tabs 24a, 24b engage into slots 34a, 34b of the inner housing. The outer housing 28 may be moved towards the second end to allow the tabs 24a, 24b to engage into slots 34a, 34b, and to retain the tabs in the slots, the outer housing may be slid back towards the first end and over the tabs. The outer housing 28 may be biased towards the first end via springs or alternative types of biasing devices.

Figure 2A:
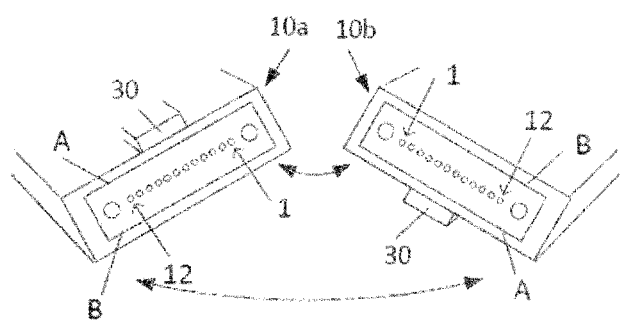
FIGS. 2A and 2B depict mating/polarity configurations of MPO connectors.
Figure 2B:
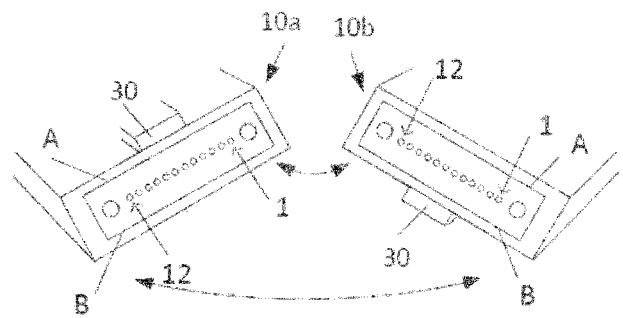

FIGS. 2A and 2B represent the two different modes of connection alignment to provide for the two different modes of polarity. FIG. 2A may be indicated as representing what may be termed a 'normal' polarity wherein fiber No. 1 of the connector 10a may mate with fiber No. 1 of connector 10b, and similarly, fiber No. 12 of the connector 10a may mate with fiber No. 12 of the connector 10b. For this type of alignment, the key 30 may be disposed adjacent side A of the ferrule, and the adapter may be keyed accordingly, with the slots 32 (FIG. 1) in correspondingly opposed surfaces within the adapter 12. To reverse the polarity of the connection between connectors 10a, 10b, as shown in FIG. 2B, the key position of the key 30 of connector 10b would need to be changed to the opposite surface for reversed alignment in an adapter 12, fiber No. 1 of the connector 10a may mate with fiber No. 12 of connector 10b, and similarly, fiber No. 12 of the connector 10a may mate with fiber No. 1 of the connector 10b. Alternatively, the key 30 of the connector 10a could be changed, or in a further embodiment, a different type of adapter may be used, wherein the slots 32 may be aligned on the same internal surface within the adapter 12.

Figure 3A:
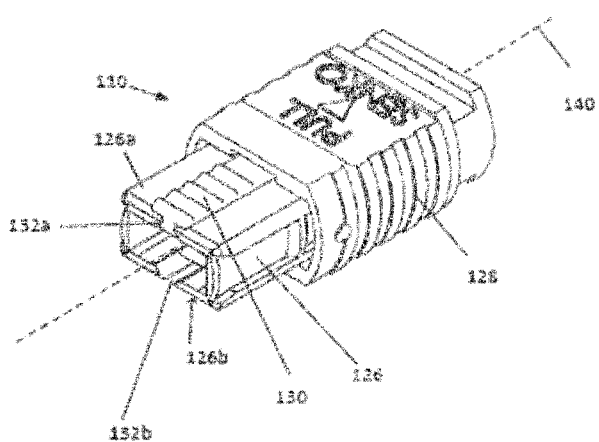
FIGS. 3A and 3B are representative top and bottom perspective views of a fiber optic connector housing with a detachable key for changing the polarity of the connector.
Figure 3B:
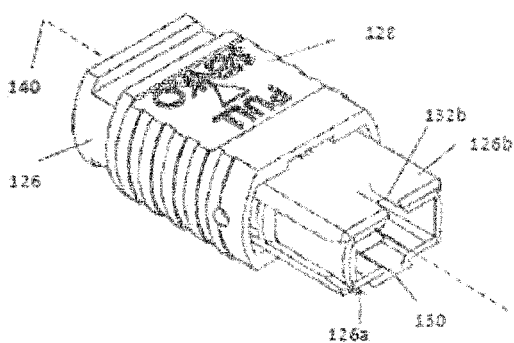

Since an adapter 12 may already be permanently mounted on a surface, and may have a cable plugged into a back side thereof, an embodiment wherein the location of key 30 may be changed would provide for a quick, onsite polarity change. An embodiment of a connector 110 having a detachable key 130 is represented in FIG. 3. For clarity, the ferrule and any cable and cabling components are omitted. The connector may include an inner housing 126 and an outer housing 128. The inner housing may have a top side wall 126a and a bottom side wall 126b that may be disposed opposite one another, or rotationally, 180° from one another about a central longitudinal axis 140. The designation top and bottom are used for reference only as per the orientation shown, and could alternatively be interchanged. In an embodiment, each of the side walls 126a and 126b may be similar, or essentially the same, and each side wall may include a corresponding slot 132a and 132b that is configured for receiving the key 130. At least a portion of the key 130 may be configured to be removably insertable into either of the slots 132a and 132b. The key 130 may be configured in conjunction with the walls 126a and 126b to be removably attached with either the top wall 126a or the bottom wall 126b. In an embodiment, when key 130 is disposed with the top wall 126a, the connector 110 may be configured to define a first keyed configuration for insertion of the first end of the connector into an adapter in only a first orientation to define a first polarity with respect to the adapter. Alternatively, when key 130 is disposed with the bottom wall 126b, the connector 110 may be configured to define a second keyed configuration for insertion of the first end into the adapter in only a second orientation to define a second polarity with respect to the adapter. As discussed previously, the second polarity may be considered to be opposite to the first polarity.

Figure 4:
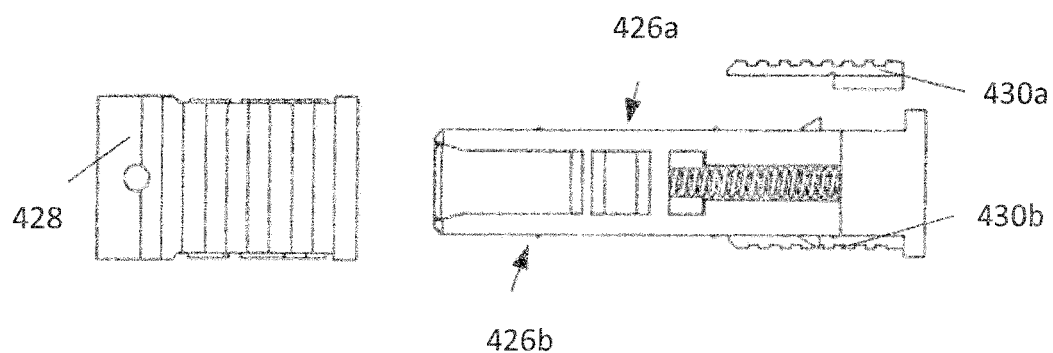
FIG. 4 is a side view of an optical fiber connector having two keys for changing the polarity of the connector.

In some embodiments, two movable kays may be used for switching the polarity configuration between a multi-fiber fiber optic connector and a corresponding adapter configured for receiving the connector, as shown for example in FIG. 4. The connector may include a connector housing comprising a first end for being inserted into the adapter, a second end disposed opposite the first end, and at least first and second movably displaceable keys displaceable along the housing between a first position adjacent the first end and a second position disposed towards the second end. One of the first and second keys may be in its first position and the other of the first and second keys may be in its second position to provide a first polarity for the fiber optic connector. The outer housing may be positioned around the inner housing, in a default position that may be biased towards the first end of the inner housing. The outer housing may be configured to be pulled back so as to slide back in a longitudinal direction along the inner housing, allowing slidingly displacing the first key from its corresponding first or second position to the other of the first and second positions, and slidingly displacing the second key from its corresponding first or second position to the other of the first and second positions, to provide a second opposite polarity for the fiber optic connector. The keys may be configured to be movable when the outer housing 128 is first displaced towards the back end of the inner housing 126.

FIG. 4 shows a side view of an embodiment wherein the displaceable keys 430a and 430b may be displaceable relative to the outer housing 428 and inner housing 426. The connector may be configured with a first polarity with key 430a in a forward 'active' position and key 430b in a hidden 'inactive' position. To change the polarity, the outer housing 428 may be displaced rearwardly on the inner housing 426. After displacing the outer housing 428, keys 430 will be partially exposed. Key 430a may be slid rearwardly out of its 'active' position into its 'inactive' position and, placing both keys in their 'inactive' position. Key 430b may then be slid forwardly out of its 'inactive' hidden position into its 'active' position, and the outer housing 428 may be released to return to its forward position.

While the above-described sequence represents one mode of switching the polarities, the sequence of movements may be altered. For example, key 430b may be moved forwardly prior to moving key 430a rearwardly.

Figure 5:
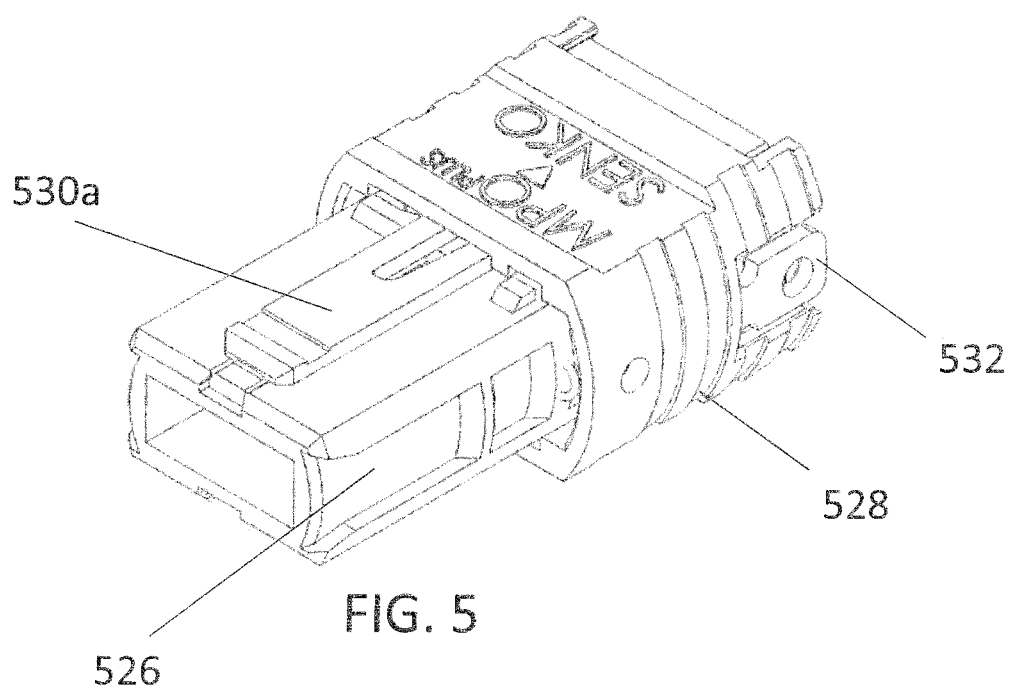
FIG. 5 is perspective view of an optical fiber connector having a lockable outer housing according to aspects of the present disclosure.

In the embodiments described above, the polarity change function may be facilitated by configuring the connector such that the outer housing may be lockable in the pulled back position. FIG. 5 is perspective view of an optical fiber connector having a lockable outer housing 528 according to aspects of the present disclosure. The lockable housing 528 is configured to slide over the inner housing 526. Moving the outer housing 528 backwards towards a rear portion of the inner housing 526, and locking it in the rearward position allows a user to easily change the polarity of the connector by using both hands to manipulate the keys 530a and 530b. The outer housing 528 includes a flexible portion 532 configured to engage a mating portion of the inner housing 526 so as to lock the outer housing in the rearward position.

Figure 6:
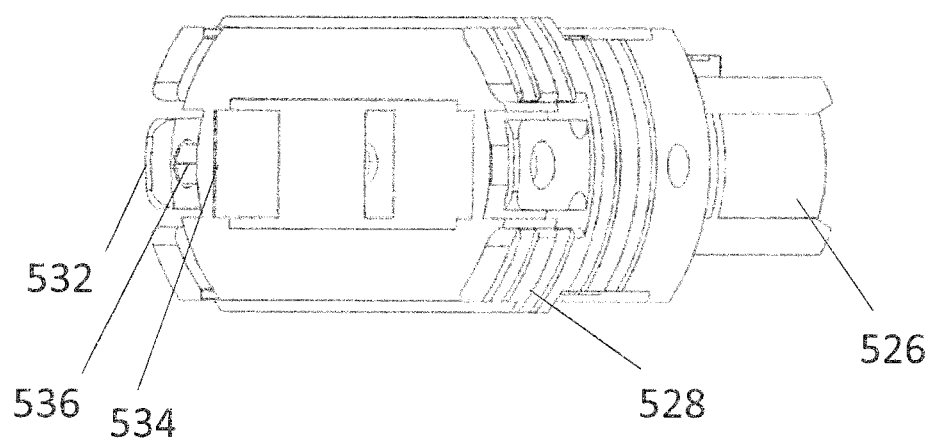
FIG. 6 is a rear perspective view of the optical fiber connector of FIG. 5.

FIG. 6 is a rear perspective view of the optical fiber connector of FIG. 5, further showing a mating portion 534 of the inner housing 526, having a protruding portion 536 configured to engage with an opening of the flexible portion 532 of the outer housing 528. As the outer housing 528 is pulled rearwards, the flexible portion 532 may be squeezed so as to couple to the mating portion 534 of the inner housing, thereby locking the outer housing in the rearward position.

In some embodiments, the flexible portion 532 may be curved. In other embodiments, the flexible portion 532 may be flat so as to bend more easily. In some embodiments, the protruding portion 536 may be shaped cylindrically or as a dome, such that it does not have sharp corners. The flexible portion 532 may have a corresponding opening that is circularly shaped.

Figure 7:
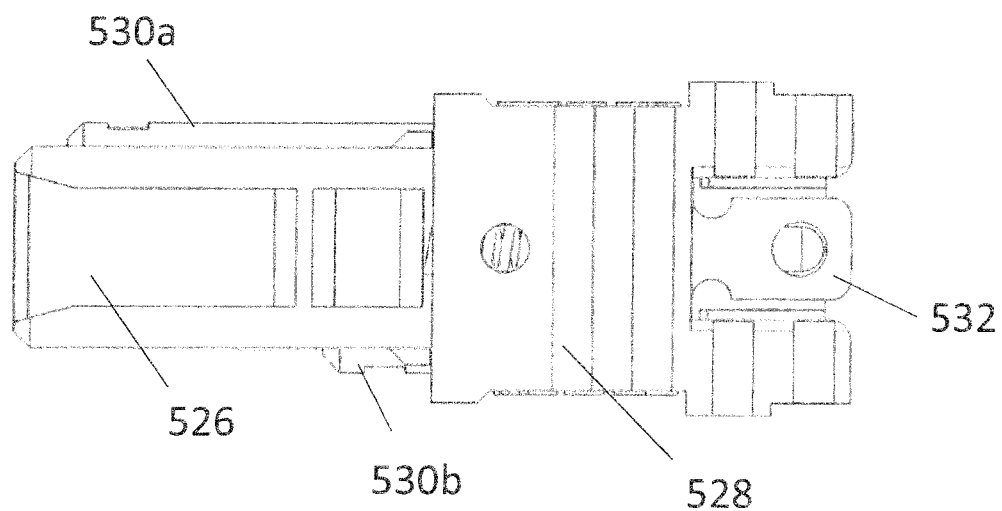
FIG. 7 is a side view of the optical fiber connector of FIG. 5.
Figure 8:
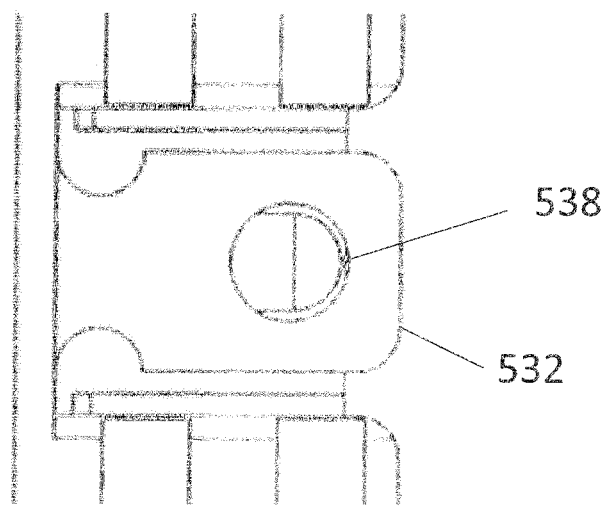
FIG. 8 is a detailed side view of the flexible portion of the outer housing of the optical fiber connector of FIG. 5.

FIG. 7 is a side view of the optical fiber connector of FIG. 5, further showing the first key 530a and the second key 530b disposed at opposite sides of the inner housing 526. FIG. 8 is a detailed side view of the flexible portion 532 of the outer housing 528 of the optical fiber connector of FIG. 5, further showing a circularly shaped opening 538. The opening 538 is configured to receive the protruding portion 536 of the mating portion 534 of the inner housing 526 as shown in FIG. 6.

Figure 9:
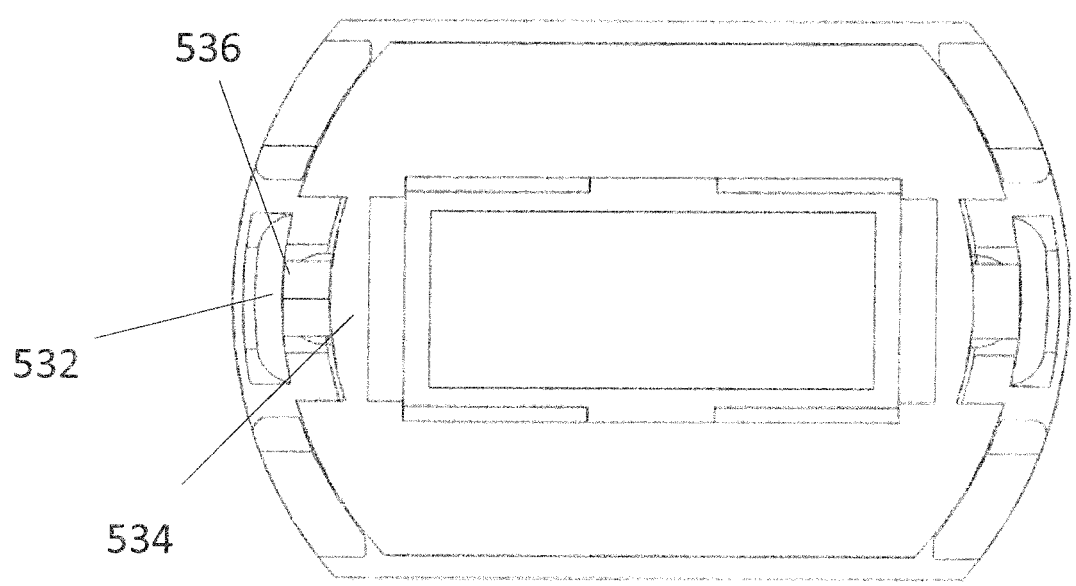
FIG. 9 is a detailed view of the lockable outer housing and inner housing portions of the optical fiber connector of FIG. 5.

FIG. 9 is a detailed view of the lockable outer housing and inner housing portions of the optical fiber connector of FIG. 5. The flexible portion 532 of the outer housing 528 is shown to be coupled to the mating portion 534 of the inner housing 526 via the protruding portion 536.

Figure 10:
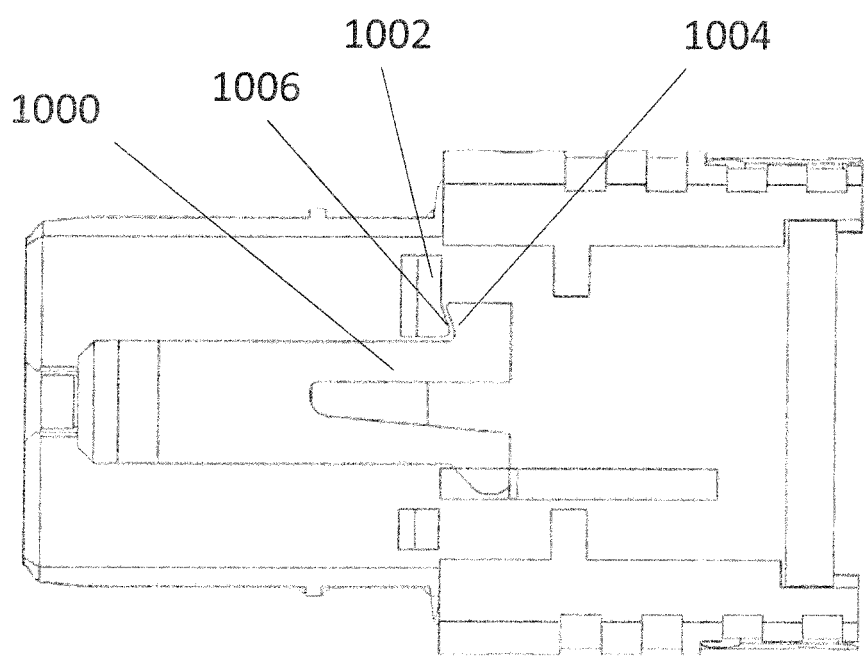
FIG. 10 is a cross-sectional view of a key having a draft angle according to aspects of the present disclosure.

FIG. 10 is a cross-sectional view of a key 1000 positioned against a portion of the inner housing 1002. The key includes a surface 1004 having a draft angle, and is positioned against a corresponding inner housing surface 1006 having a draft angle. In one embodiment, the draft angle may be about 3 degrees. The key 1000 may be included in various embodiments disclosed herein, with the advantage that the draft angle prevents the key from easily coming out or slipping out of the connector.

In the various embodiments disclosed herein, the keys and housing components, may be formed of rigid polymers or metals, for example. In general, any type of substantially rigid material may be used. The material should have a rigidity sufficient to retain the necessary engagement between the key and the housing so that the key remains in place except when a force is applied to remove the key.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An optical fiber connector comprising:
    a ferrule;
    an inner housing disposed around at least a portion of the ferrule, the inner housing having a front end portion and a rear end portion spaced apart along an axis, the front end portion of the inner housing being configured to be inserted into an optical fiber adapter, the inner housing having a first side and an opposite second side disposed on opposite sides of the ferrule, the first side comprising a first slot extending along the axis from a rear end to a front end that opens through the front end portion of the inner housing, the second side comprising a second slot extending along the axis from a rear end to a front end that opens through the front end portion of the inner housing,
    an outer housing disposed around at least a portion of the inner housing;
    an alignment key configured to:
        removably attach to the first side of the inner housing to correspond to a first polarity of the connector, wherein a portion of the alignment key is received in the first slot when the alignment key is attached to the first side of the inner housing to correspond to the first polarity of the connector;
        removably attach to the second side of the inner housing to correspond to a second polarity of the connector, wherein a portion of the alignment key is received in the second slot when the alignment key is attached to the second side of the inner housing to correspond to the second polarity of the connector and wherein the first polarity is opposite the second polarity; and
        move relative to both the inner housing and the outer housing to change the connector between the first polarity and the second polarity.

2. The optical fiber connector of claim 1, wherein the outer housing is configured to slide toward a distal end of the connector.

3. The optical fiber connector of claim 2, wherein the outer housing is configured to be retained in a locked position after sliding toward the distal end.

4. The optical fiber connector of claim 3, further comprising at least one biasing member for biasing the outer housing towards a front of the inner housing.

5. The optical fiber connector of claim 4, wherein the alignment key is locked in place when the outer housing is biased towards the front of the inner housing.

6. The optical fiber connector of claim 5, wherein the alignment key is moved from a first position to a second position to change the polarity of the optical fiber connector from the first polarity to the second polarity.

7. The optical fiber connector of claim 1, wherein said connector is an MPO connector.

8. An optical fiber connector comprising:
    a ferrule;
    an inner housing disposed around at least a portion of the ferrule, the inner housing having a front end portion and a rear end portion spaced apart along an axis, the front end portion of the inner housing being configured to be inserted into an optical fiber adapter, the inner housing having a first side and an opposite second side disposed on opposite sides of the ferrule, the first side comprising a first slot extending along the axis from a rear end to a front end that opens through the front end portion of the inner housing, the second side comprising a second slot extending along the axis from a rear end to a front end that opens through the front end portion of the inner housing,
    an outer housing disposed around at least a portion of the inner housing;
    at least one alignment key configured to:
        releasably connect to the first side of the inner housing at a first position that corresponds to a first polarity of the connector, wherein a portion of the at least one alignment key is received in the first slot at the front end portion of the inner housing when the at least one alignment key is connected to the first side of the inner housing at the first position; and
        releasably connect to the second side of the inner housing at a second position that corresponds to a second polarity of the connector, wherein a portion of the at least one alignment key is received in the second slot at the front end portion of the inner housing when the at least one alignment key is connected to the second side of the inner housing at the second position;
    wherein the at least one alignment key is configured to move relative to both the inner housing and the outer housing to change the connector between the first polarity and the second polarity.

\* \* \* \* \*